(12) United States Patent
Hori et al.

(10) Patent No.: US 10,377,009 B2
(45) Date of Patent: Aug. 13, 2019

(54) MACHINE TOOL (71) Applicant: NAKAMURA-TOME PRECISION INDUSTRY CO., LTD., Hakusan, Ishikawa (JP)

(72) Inventors: Koki Hori, Kanazawa (JP); Hiroyuki Tada, Nomi (JP); Naotsugu Nishimura, Hakusan (JP); Masaru Osugi, Nomi-gun (JP)

(73) Assignee: NAKAMURA-TOME PRECISION INDUSTRY CO., LTD., Hakusan (JP)

( * ) Notice: Subject to any disclaimer, the term of this patent is extended or adjusted under 35 U.S.C. 154(b) by 121 days.

(21) Appl. No.: 15/494,961

(22) Filed: Apr. 24, 2017

(65) Prior Publication Data

US 2018/0169816 A1 Jun. 21, 2018

(30) Foreign Application Priority Data

Dec. 15, 2016 (JP) ................. 2016-243192

(51) Int. Cl.
*B23Q 17/24* (2006.01)
*B23Q 1/00* (2006.01)
(Continued)

(52) U.S. Cl.
CPC ....... *B23Q 17/2409* (2013.01); *B23Q 1/0045* (2013.01); *G06F 3/0488* (2013.01);
(Continued)

(58) Field of Classification Search
CPC ............. G06F 21/10; G06F 2221/2135; G06F 2221/0737; G06F 2221/2101; G06F 21/86;
(Continued)

(56) References Cited

U.S. PATENT DOCUMENTS 8,965,806 B2 * 2/2015 Fukudome ............. G06F 21/31
705/50
2007/0195344 A1 * 8/2007 Mochizuki .......... G06F 17/3025
358/1.9
(Continued)

FOREIGN PATENT DOCUMENTS

DE  102004048037 A1  4/2006
DE  202014102322 U1  8/2014
(Continued)

OTHER PUBLICATIONS

Nov. 5 to 6, 2016 Certificate for Application of Exeception to Loss of Novelty of Invention issued in Japanese Patent Application No. 2016-243192.
(Continued)

*Primary Examiner* — Dave Czekaj
*Assistant Examiner* — Kehinde Abimbola
(74) *Attorney, Agent, or Firm* — Oliff PLC (57) ABSTRACT

A machine tool is configured so that a working area in which a workpiece is worked using a tool can be monitored, and includes a cover that is provided to cover the working area, and isolates the inside of the machine tool that includes the working area from the outside, at least one camera that is provided to the inner side of the cover, and captures the inside of the machine tool, and a touch panel that is provided to the cover, wherein the touch panel includes a display panel and an input operation panel, and the display panel displays an image of the inside of the machine tool that has been captured by the at least one camera.

5 Claims, 8 Drawing Sheets (51) Int. Cl.
*G06F 3/0488* (2013.01)
*G06K 9/00* (2006.01)
*H04N 5/225* (2006.01)
*H04N 7/18* (2006.01)
*H04N 5/232* (2006.01)
*H04N 5/247* (2006.01)

(52) U.S. Cl.
CPC ..... *G06K 9/00771* (2013.01); *H04N 5/23293* (2013.01); *H04N 5/247* (2013.01); *H04N 7/181* (2013.01)

(58) Field of Classification Search
CPC ....... G06F 2221/2151; G06F 2211/007; F17D 1/08; F17D 3/00; F17D 3/01; F17D 3/18; G01F 15/06; G01F 1/00; G01F 23/00
See application file for complete search history.

(56) References Cited

U.S. PATENT DOCUMENTS

| | | | | |
|---|---|---|---|---|
| 2009/0208138 | A1* | 8/2009 | Fukudome | G06F 21/31 382/305 |
| 2012/0176405 | A1* | 7/2012 | Katsukura | G06F 8/38 345/619 |
| 2015/0205287 | A1 | 7/2015 | Igarashi et al. | |
| 2016/0117090 | A1* | 4/2016 | Fujitsuka | G05B 19/409 715/765 |
| 2017/0131692 | A1* | 5/2017 | Kawai | G05B 19/4063 |
| 2017/0160722 | A1* | 6/2017 | Kawai | G05B 19/4063 |

FOREIGN PATENT DOCUMENTS

| | | |
|---|---|---|
| DE | 102016102902 A1 | 9/2016 |
| EP | 1548529 A1 | 6/2005 |
| EP | 1932618 A1 | 6/2008 |
| JP | 2011-154436 A | 8/2011 |
| JP | 2013-176822 A | 9/2013 |
| WO | 2014/054104 A1 | 4/2014 |

OTHER PUBLICATIONS

Nov. 17 to 22, 2016 Certificate for Application of Exeception to Loss of Novelty of Invention issued in Japanese Patent Application No. 2016-243192.

Dec. 27, 2016 Application for certificate for exception to loss of novelty issued in Japanese Patent Application No. 2016-243192.

Hori et al. "Reference Exhibit Smart Window". Nakamura-Tome Precision Industry Co., Ltd.

Hori et al. "Smart Window". Nakamura-Tome Precision Industry Co., Ltd.

Jul. 3, 2017 Extended European Search Report issued in European Patent Application No. 17151578.6.

* cited by examiner

MACHINE TOOL

Japanese Patent Application No. 2016-243192 filed on Dec. 15, 2016, is hereby incorporated by reference in its entirety.

BACKGROUND

The present invention relates to a machine tool that is configured so that the working area can be monitored.

A machine tool is known in which the working area for working the workpiece is covered with a cover in order to prevent a situation in which chips formed in the working area, a coolant, and the like scatter from the working area.

Such a cover is normally provided with a door that allows access to the working area, and a window that is formed of transparent glass or the like and provided to the door so that the inside of the machine tool can be monitored.

However, such a window (transparent panel) has a problem in that the working area can be monitored in only one direction, and it is impossible to monitor the workpiece working point in a plurality of directions.

WO2014/054104 discloses a machine tool provided with a see-through display device that is configured so that the direction of the axis of the machine tool can be displayed on a window as an axis configuration model in a manual operation mode.

In WO2014/054104, a function of an operation panel is provided to a transparent window that is used to monitor the inside of the machine tool. However, the inside of the machine tool can be monitored through the window in only one direction.

SUMMARY

An object of the invention is to provide a machine tool that is configured so that the working area can be monitored without necessarily requiring a transparent window.

Another object of the invention is to provide a machine tool that is configured so that the working area can be monitored in a plurality of directions.

A further object of the invention is to provide a machine tool that is configured so that the operation state of the machine tool can be displayed and analyzed, for example.

A machine tool according to one aspect of the invention includes a cover that is provided to cover a working area in which a workpiece is worked using a tool, and isolates the inside of the machine tool that includes the working area from the outside, at least one camera that is provided to the inner side of the cover, and captures the inside of the machine tool, and a touch panel that is provided to the cover, wherein the touch panel includes a display panel and an input operation panel, and the display panel displays an image of the inside of the machine tool that has been captured by the at least one camera.

The term "working area" used herein refers to an area in which the workpiece is subjected to various types of working using a tool, such as machining (e.g., cutting, turning, and polishing), welding, and laser processing. The machine tool according to the invention includes the cover that is provided to cover such a working area.

The expression "the inside of the machine tool that includes the working area" is used since an accessory such as an automatic tool changer may be provided inside the machine tool, and a camera that monitors such an accessory is optionally provided.

According to the invention, since the inside of the machine tool that includes the working area is captured using the at least one camera that is provided to the inner side of the cover, it is unnecessary to provide a monitor window that is formed using a transparent panel.

It has been common to provide a monitor window to the door provided to the cover. According to the invention, since it is unnecessary to provide a monitor window, a touch panel can be provided to the door.

When a monitor window (e.g., a see-through window such as a glass window) is provided to the door, it is necessary to replace the window when the window has deteriorated due to chips and the like. According to the invention, since it is unnecessary to provide such a monitor window, the entirety of the door can be formed using a sheet metal (e.g., metal sheet) (i.e., non-see-through member), and it is unnecessary to replace the window (door).

In the invention, the touch panel may be provided as part of a see-through window, or may be provided together with a see-through window.

In the machine tool according to one aspect of the invention, the display mode of the display panel may include at least a camera capture display mode and a machine tool operation data display mode. In the camera capture display mode, an image of the inside of the machine tool captured by the camera is displayed. In the operation data display mode, the operation state of the machine tool is displayed.

The operation data of the machine tool refers to various types of data regarding the operation of the machine tool.

Examples of the operation data include a machine state such as an NC status, coolant information, and modal information, sensor information such as temperature data and load data, pressure information such as hydraulic pressure and chuck pressure, servo information such as load value display, origin state display, remaining moving amount display, stroke range display, and interlock state display, executed program information, tool information such as a main spindle and a spindle axis, power consumption information, user information, and the like.

The operation state is displayed on the display panel as the state display data.

The touch panel may have a function of an operation panel. In this case, it is possible to make a note using the touch panel in addition to performing various inputs.

The display data may be configured to be customized corresponding to the user's needs.

Information obtained from various sensors and the like is displayed graphically, or displayed using a meter. A threshold value may be set, and an alarm or the like may be output when the information falls outside the range specified by the threshold value.

In the invention, a plurality of cameras that capture the inside of the machine tool may be provided, and the camera capture display mode may include a manual display mode in which an image captured by an arbitrary camera among the plurality of cameras is selected. According to this configuration, it is possible to monitor the back side of the workpiece that is worked, the edge of the tool, and the like that cannot be monitored through a conventional see-through window. The camera capture display mode may include an automatic display mode in which the working area is displayed in closeup according to the working flow when the workpiece is being automatically worked. According to this configuration, it is possible to monitor the working area in the automatic mode in a plurality of directions according to the working flow.

A camera that has a wide-angle capture function, or a camera that has a capture direction adjustment function and a zoom function, may be used as the camera.

The machine tool according to one aspect of the invention may include an image database that stores image data of the inside of the machine tool captured using the camera in time series, an operation database that stores operation state display data of the machine tool in time series, and an analysis section that performs an analysis process using the log data.

It is possible to easily analyze the cause of an abnormality by logging the data captured by the camera and the operation state display data of the machine tool, and comparing the history data.

According to the invention, since the working area is captured using the camera, and the resulting image is displayed on the touch panel, it is possible to monitor the working area in a plurality of directions as compared with the case where a see-through window is used.

Since the operation data of the machine tool can be displayed, it is possible to analyze the operation state of the machine tool, and change the conditions, as required.

When the machine tool has a function of logging the data captured by the camera and the operation state display data of the machine tool, it is possible to easily compare the image data and the state display data based on history, and promptly solve a problem when an abnormality has occurred.

This makes it possible to reduce loss due to shut-down of the machine tool, and contribute to prevention of the occurrence of an abnormality.

BRIEF DESCRIPTION OF THE DRAWINGS

FIGS. 6A and 6B illustrate an example in which a camera is provided to the inner side of a door, wherein FIG. 6A illustrates the front side of the door, and FIG. 6B illustrates the inner side of the door.

DESCRIPTION OF EXEMPLARY EMBODIMENTS

A machine tool according to the exemplary embodiments of the invention is described below with reference to the drawings. Note that the invention is not limited to the following exemplary embodiments.

Figure 1A:
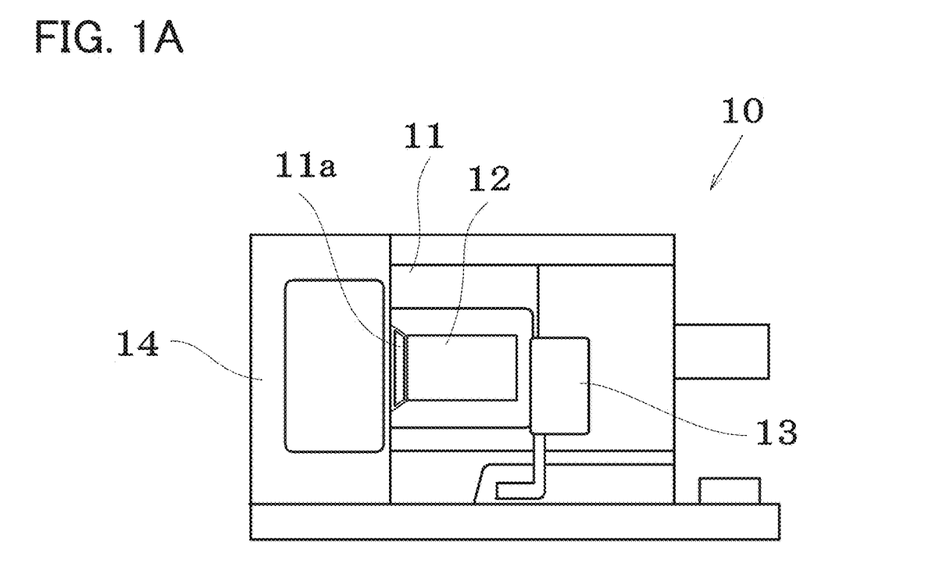
FIG. 1A illustrates a state in which a door provided with a touch panel has been closed.
Figure 1B:
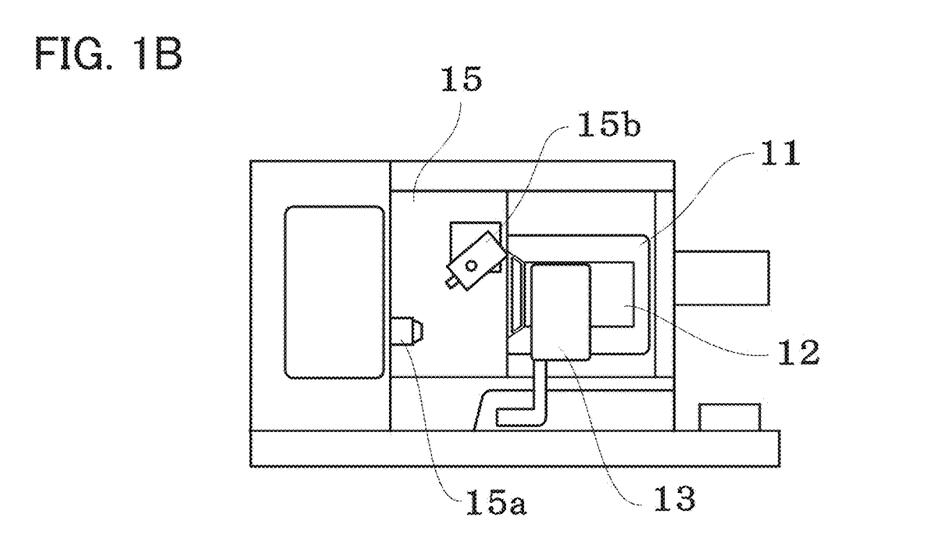
FIG. 1B illustrates a state in which the door has been opened.

A machine tool 10 illustrated in FIGS. 1A and 1B includes an automatic tool changer (ATC) 14. The machine tool 10 includes a sliding door 11, and an operation panel 13 that is provided in front of the opening-closing area of the door 11.

FIG. 1A illustrates a state in which the door 11 has been closed, and FIG. 1B illustrates a state in which the door 11 has been opened.

The door 11 is provided to cover a working area 15. The door 11 is provided as part of a cover that isolates the inside of the machine tool that includes the working area from the outside.

The working area 15 may include a main spindle 15a that serves as a workpiece support that chucks a workpiece, a tool post (turret) 15b that serves as a tool support that supports a tool such as an edged tool, and a means that relatively moves the workpiece and the tool.

Note that the working means (tool) is not limited to an edged tool. Various other working means may be used.

In the example illustrated in FIG. 1A, a touch panel 12 is provided to the door 11. The touch panel 12 need not be a see-through touch panel. The touch panel 12 may be provided to a frame or a door panel made of a sheet metal or the like.

An opening-closing handle 11a is provided to the door 11.

The camera installation position may be arbitrarily selected taking account of the structure inside the machine tool.

Figure 6A:
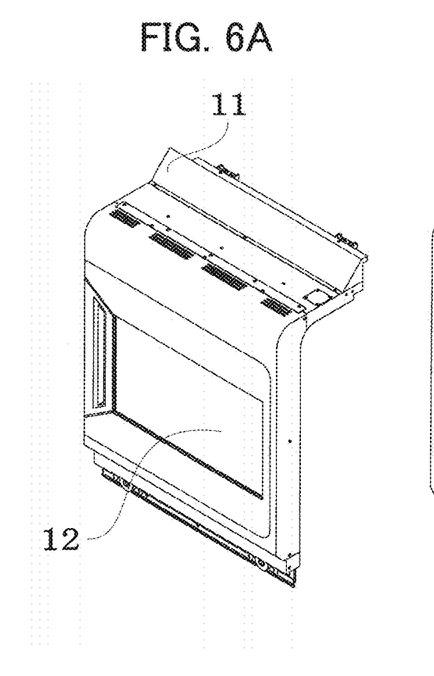
Figure 6B:
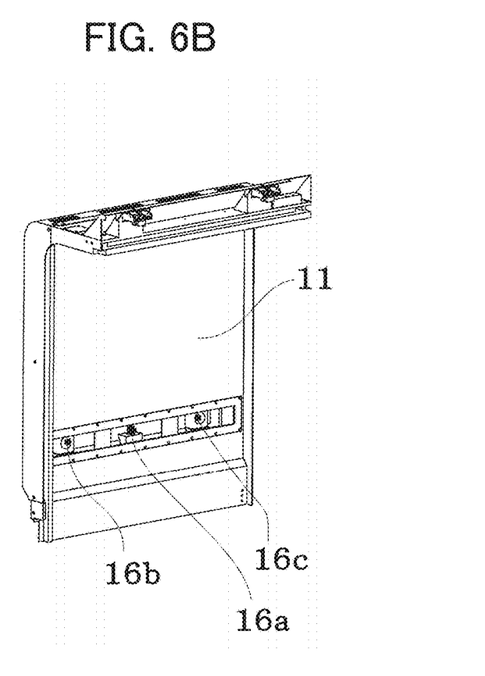

As illustrated in FIG. 6B, a wide-angle camera 16a is provided to the inner side of the door 11 so as to be situated at the center of the door 11 in the rightward-leftward direction. Note that FIG. 6B is an interior view illustrating the door 11 illustrated in FIG. 6A.

Figure 7A:
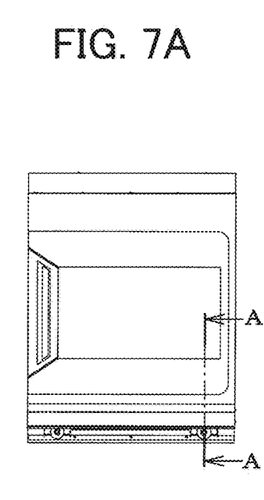
FIG. 7A illustrates an example in which a main spindle camera is provided to the inner side of a door.
Figure 7B:
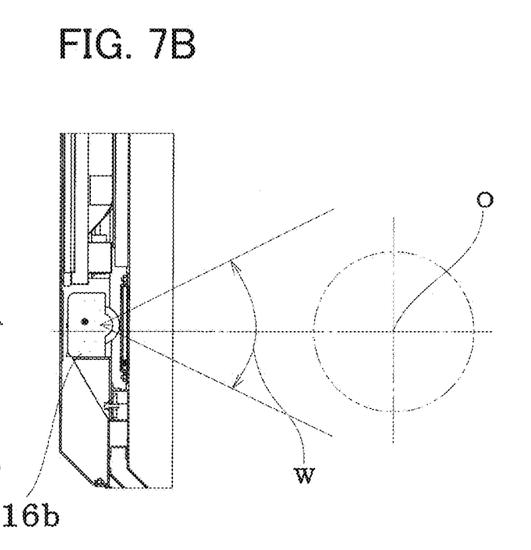
FIG. 7B illustrates the field of view of the main spindle camera.

An R-side main spindle camera 16b and an L-side main spindle camera 16c are provided on either side of the wide-angle camera 16a. As illustrated in FIG. 7B that is a cross-sectional view taken along the line A-A illustrated in FIG. 7A, these cameras 16b and 16c have a given field of view W around the center O of the main spindle.

Figure 8A:
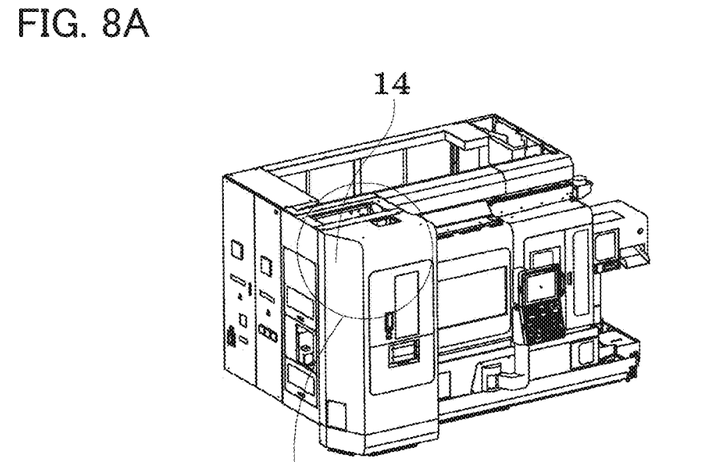
FIG. 8A illustrates an automatic tool changer (ATC)
Figure 8B:
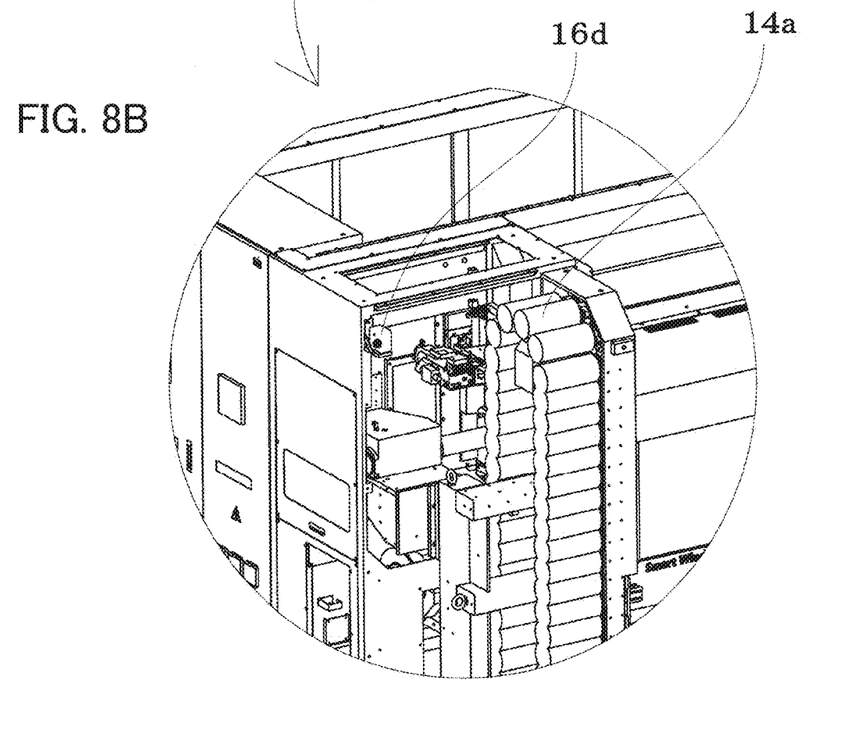
FIG. 8B illustrates an example in which a camera is provided to face a tool holder provided in the ATC.

A camera 16d that captures the motion of an ATC tool holder 14a that is provided inside the ATC (automatic tool changer) 14 illustrated in FIG. 8A, is also provided (see FIG. 8B).

Figure 2A:
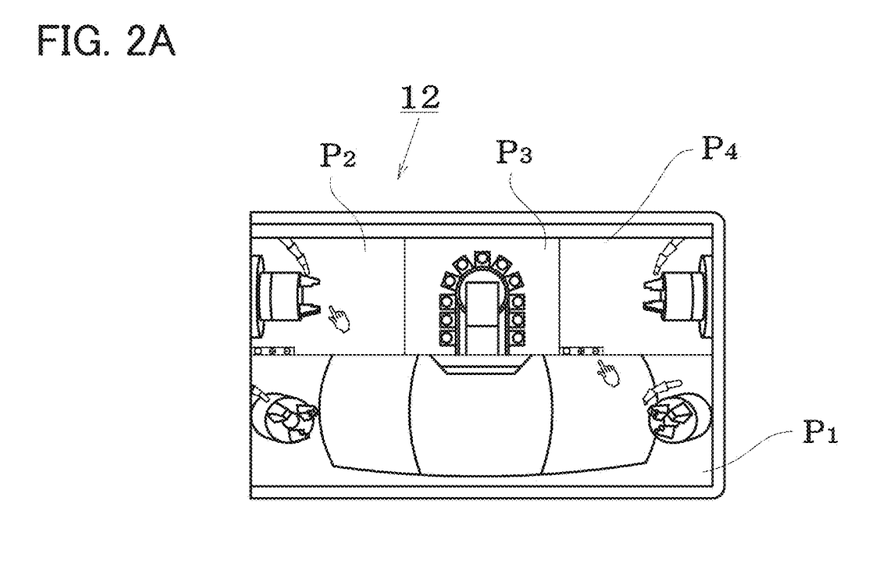
FIG. 2A illustrates a display example of the entire touch panel in a camera mode.
Figure 2B:
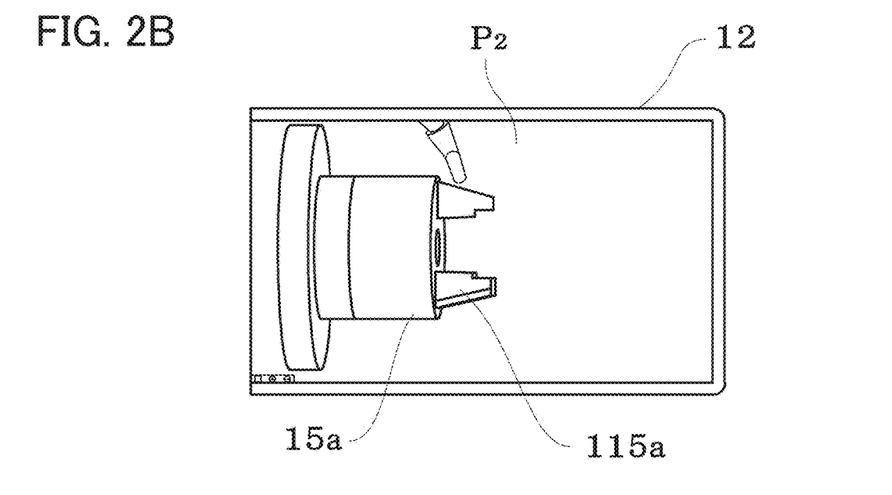
FIG. 2B illustrates a closeup (zoom-in) display example.

FIGS. 2A and 2B illustrate an example in which the touch panel 12 has been set to a camera capture display mode.

An image $P_1$ illustrated in FIG. 2A is an image captured by the wide-angle camera 16a that can capture almost the entirety of the working area 15.

An image $P_2$ and an image $P_4$ illustrated in FIG. 2A are respectively an image of the left main spindle and an image of the right main spindle captured by the camera 16b and the camera 16c. An image $P_3$ illustrated in FIG. 2A is an example of an image of the tool holder 14a of the ATC 14 captured by the camera 16d.

When an icon displayed on the touch panel 12 is operated in this state, the image $P_2$ is zoomed in, for example. FIG. 2B illustrates a state in which the image $P_2$ that is used to check the state of a chuck 115a of the main spindle 15a has been zoomed in.

It is possible to check the machine tool in various directions by thus selecting the cameras 16a to 16d when selectively checking each part of the machine tool in a manual mode.

When the machine tool is set to an automatic mode, the camera images are automatically enlarged in a sequential manner along the working points of the workpiece based on the working state acquired from an NC.

Figure 3:
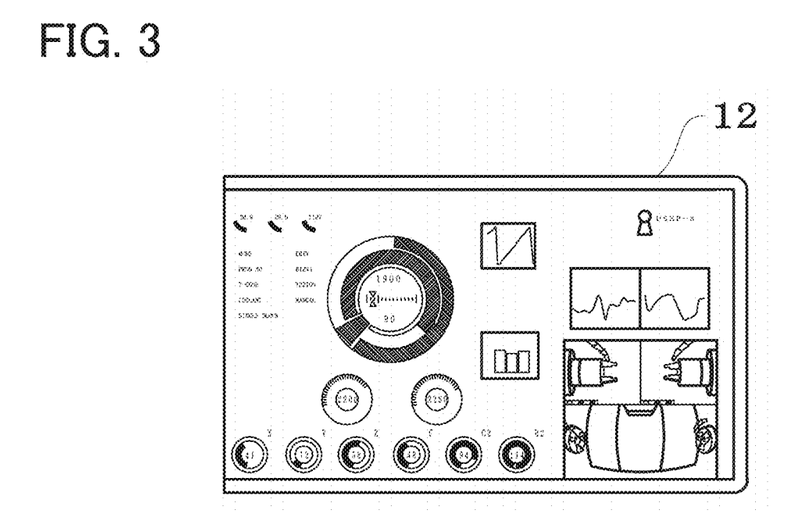
FIG. 3 illustrates an example of an operation data display mode.

When the mode is switched from the camera capture display mode to an operation data display mode by operating an icon displayed on the touch panel 12, the program execution state, various types of sensor information, main spindle information, and the like are displayed in real time together with the camera images (see FIG. 3), for example.

The operation panel of the touch panel 12 can be used in various ways (e.g., can be used to make a note) in addition to changing the mode change and the operation conditions.

Figure 4:
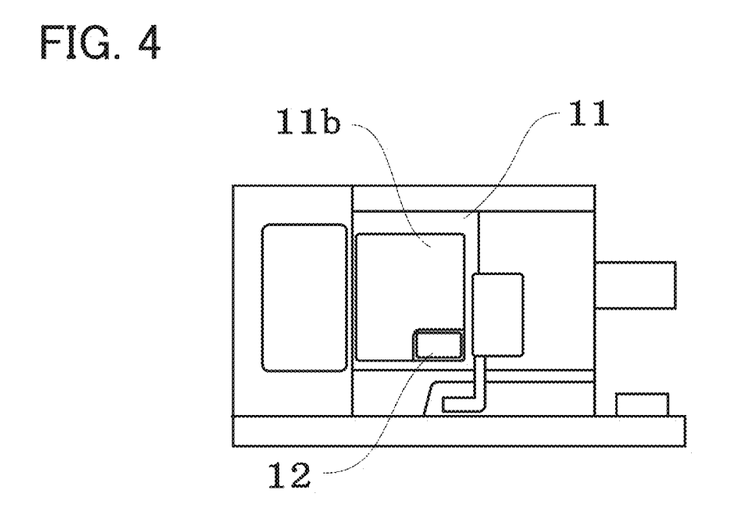
FIG. 4 illustrates an example in which a touch panel is provided to part of a see-through window of a door.

FIG. 4 illustrates an example in which the touch panel 12 is provided to part of a see-through window 11*b* of the door 11. In this case, the working area can be monitored through the see-through window lib of the door 11, and the state of part of the working area that cannot be easily observed through the see-through window 11*b* can be monitored using the camera image displayed on the touch panel 12.

Figure 5:
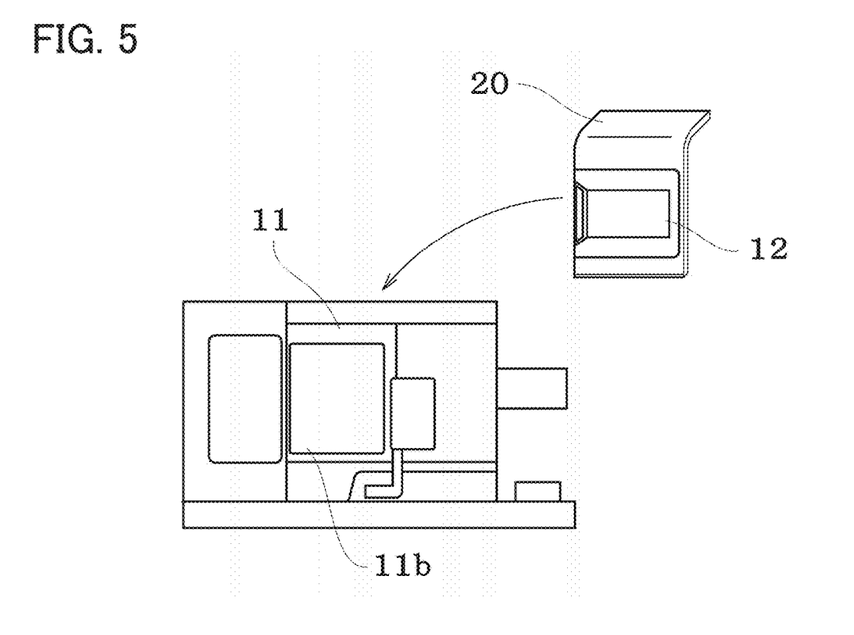
FIG. 5 illustrates an example in which a touch panel is provided to an existing door.

FIG. 5 illustrates an example in which the touch panel 12 according to the invention is provided to a door 11 of an existing machine tool using a connection member 20.

In this case, a camera is also installed in the working area.

Figure 9:
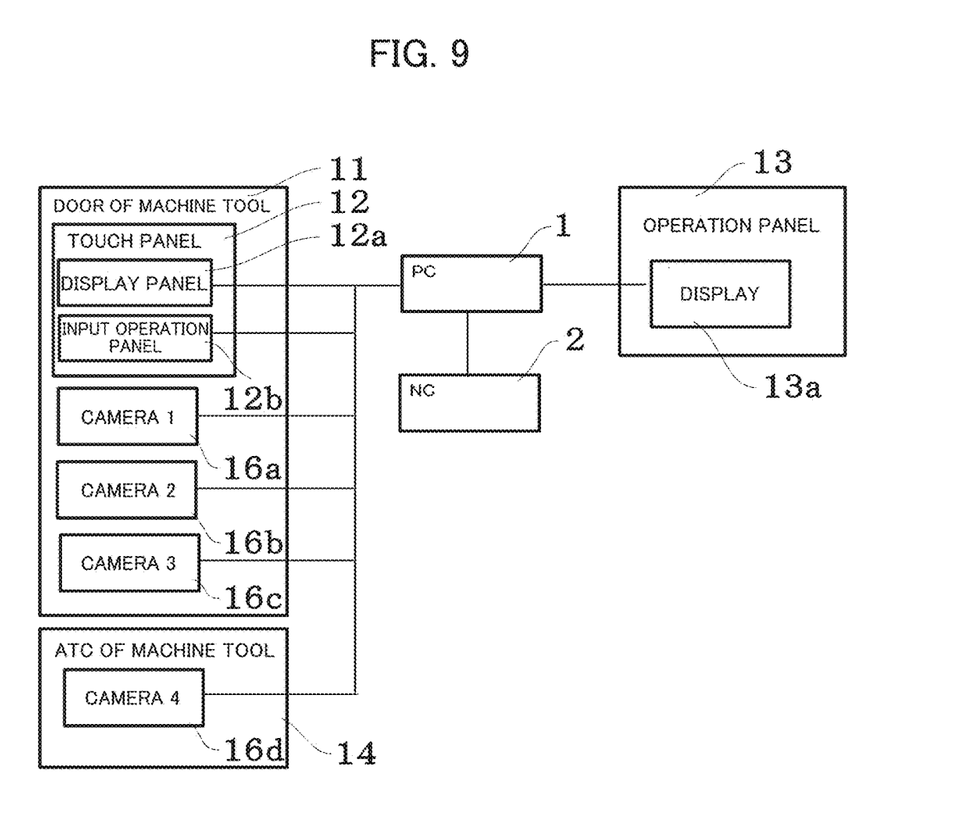
FIG. 9 is a block diagram illustrating a monitoring system of a machine tool.

FIG. 9 is a block diagram illustrating the monitoring system of the machine tool 10.

The machine tool 10 includes a numerical control device (NC) 2, and is controlled by a personal computer (PC) 1.

The user inputs the working conditions using the operation panel 13, and the working conditions are displayed on a display 13*a*.

The touch panel 12 is provided to the front side of the door 11 of the machine tool. As illustrated in FIG. 6, a camera 1 (16*a*), a camera 2 (16*b*), and a camera 3 (16*c*) are provided to the inner side of the door 11.

A camera 4 (16*d*) is provided to the ATC 14 of the machine tool 11.

The touch panel 12 includes a display panel 12*a*. The images captured by the cameras 16*a* to 16*d*, and operation data (e.g., parameters and sensor information) are displayed on the display panel 12*a*.

An input operation panel 12*b* for switching the display mode and the display data is provided integrally with the display panel 12*a* in the form of an icon, or provided separately from the display panel 12*a*.

Figure 10:
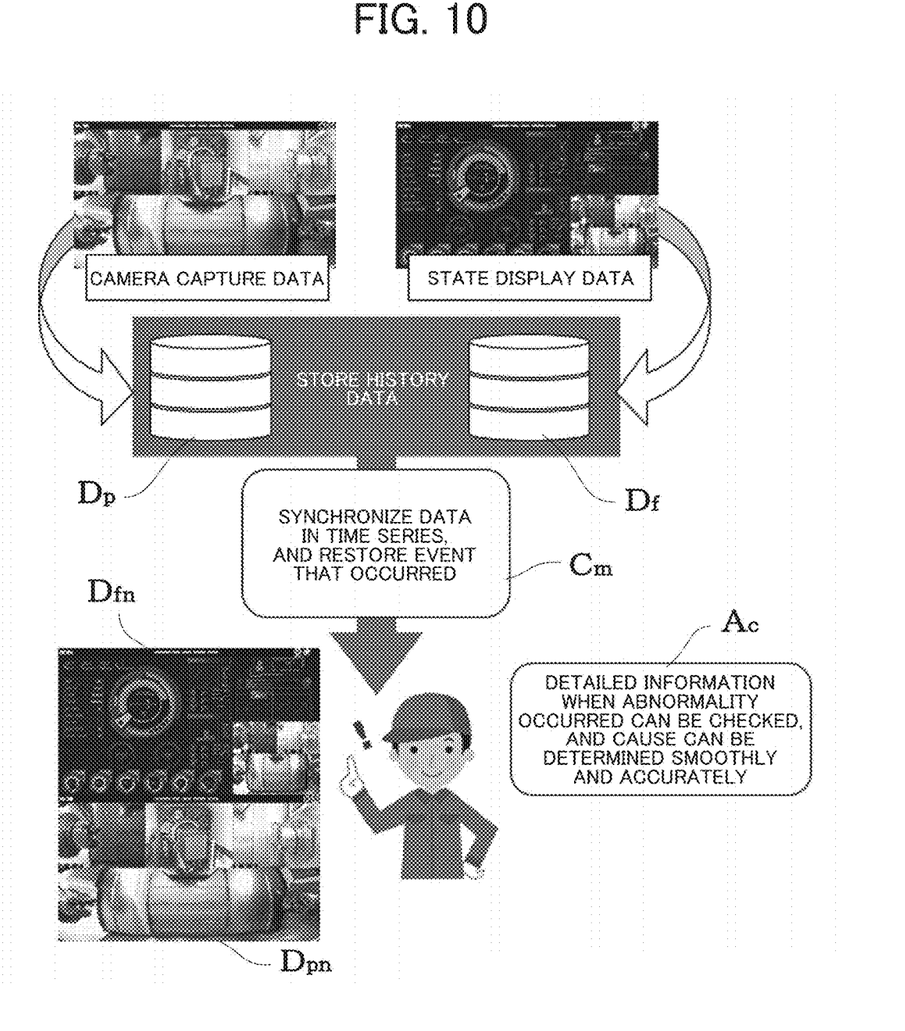
FIG. 10 illustrates a data log application example.

As illustrated in FIG. 10, the PC 1 includes an image database $D_p$ that stores the camera capture data in time series, an operation database $D_f$ that stores the operation state display data of the machine tool in time series, and an analysis section ($C_m$) that performs an analysis process using the log data.

For example, when it has been found that an abnormality has occurred for some reason, the analysis section ($C_m$) synchronizes the image at the timing when the abnormality occurred and the state display data in time series, and restores the event that occurred.

The detailed information when the abnormality occurred can be checked by comparing the state (working state) of the tool and the workpiece obtained from the restored image data $D_{fn}$ with the state display data $D_{pn}$, and the cause can be determined smoothly and accurately (see $A_c$ in FIG. 10).

The state display data is not particularly limited.

For example, the following information is displayed.

Machine Operation State

The program number, the execution block of the program, the remaining blocks, and the like obtained from the NC are displayed.

The override, the rotational speed, the load, and the like of the main spindle obtained from the NC are displayed using a meter.

The modal information (e.g., T code and G code) obtained from the NC is displayed.

Sensor Information

The temperature data, the load data, the instantaneous power consumption, and the like are displayed graphically.

Pressure Information

The hydraulic pressure, the chuck pressure, and the like of the pressure unit are displayed using a meter.

Servo Information

The load value, the origin state, the remaining moving amount, the stroke range, the interlock information, and the like are displayed using a meter.

What is claimed is:

1. A machine tool comprising a cover that is provided to cover a working area in which a workpiece is worked using a tool, and isolates the inside of the machine tool that includes the working area from the outside, comprising:
    at least one camera that is provided to the inner side of the cover, and captures the inside of the machine tool;
    a touch panel that is provided to the cover, the touch panel including a display panel and an input operation panel, and the display panel displaying an image of the inside of the machine tool that has been captured by the at least one camera;
    a personal computer including an image database that stores data captured by the at least one camera in time series, an operation database that stores operation state display data of the machine tool in time series, and a processor that performs an analysis process using log data stored in the image database and the operation database; and
    a numerical controller controlled by the personal computer,
    wherein the display panel is configured to display in an automatic mode to enlarge images of working points of the workpiece captured by the at least one camera automatically one after another in a sequential manner along a sequence of the working points based on a working state acquired from the numerical controller.

2. The machine tool as defined in claim 1, wherein the touch panel is provided to a door that is provided to the cover.

3. The machine tool as defined in claim 2, wherein the entirety of the door is formed using a non-see-through member.

4. The machine tool as defined in claim 1, wherein a display mode of the display panel provided to the touch panel comprises at least a camera capture display mode and a machine tool operation data display mode.

5. The machine tool as defined in claim 4,
    wherein the at least one camera comprises a plurality of cameras,
    the camera capture display mode comprises the automatic mode and a manual mode, and
    in the manual mode, an image captured by an arbitrary camera among the plurality of cameras is selected.

* * * * *